(12) United States Patent
Meiners (10) Patent No.: US 6,297,971 B1
(45) Date of Patent: Oct. 2, 2001

(54) PHASE CONVERTER

(75) Inventor: Larry G. Meiners, Rapid City, SD (US)

(73) Assignee: Phase Technologies, LLC, Rapid City, SD (US)

( * ) Notice: Subject to any disclaimer, the term of this patent is extended or adjusted under 35 U.S.C. 154(b) by 0 days.

(21) Appl. No.: 09/638,230

(22) Filed: Aug. 14, 2000

Related U.S. Application Data (63) Continuation-in-part of application No. 09/383,795, filed on Aug. 26, 1999, now abandoned.
(60) Provisional application No. 60/132,551, filed on May 5, 1999.

(51) Int. Cl.[7] .............................. H02M 3/36; H02M 5/45
(52) U.S. Cl. .................................. 363/36; 363/37
(58) Field of Search .................................. 363/36, 37, 34, 363/40, 41, 49, 4, 148, 149; 318/768, 781, 787, 807

(56) References Cited

U.S. PATENT DOCUMENTS

| | | | |
|---|---|---|---|
| 3,673,480 | * | 6/1972 | Johnstone .............................. 318/768 |
| 4,492,911 | | 1/1985 | Molitor . |
| 4,656,575 | | 4/1987 | West . |
| 4,777,421 | | 10/1988 | West . |
| 4,849,950 | | 7/1989 | Sugiura et al. . |
| 4,855,652 | | 8/1989 | Yamashita et al. . |
| 4,899,268 | * | 2/1990 | Hollinger ................................ 363/4 |
| 4,978,894 | | 12/1990 | Takahara . |
| 5,065,305 | | 11/1991 | Rich . |
| 5,187,654 | | 2/1993 | Felippe . |
| 5,272,616 | | 12/1993 | Divan et al. . |
| 5,293,108 | | 3/1994 | Spudich . |
| 5,402,053 | * | 3/1995 | Divan et al. ......................... 318/768 |
| 5,621,296 | * | 4/1997 | Werner et al. ....................... 318/768 |
| 5,793,623 | | 8/1998 | Kawashima et al. . |
| 6,188,676 | * | 9/2000 | Divan et al. ............................ 363/34 |

* cited by examiner

Primary Examiner—Rajnikant B. Patel
(74) Attorney, Agent, or Firm—Ancel W. Lewis, Jr.

(57) ABSTRACT

A phase converter that converts single phase AC electric power to balanced three phase AC power. Two input terminal connected to the output of a single phase AC power source connect directly to two output terminals of the converter. The phase converter has two serially connected storage capacitors with a common connection, a charging circuit for controlled charging the storage capacitors and an output circuit for controlled discharge of the storage capacitors to provide single phase AC power to a third output terminal. The charging circuit controls input to the storage capacitor to provide a sinusoidal input current and to step up the voltage to the storage capacitors. The output circuit provides output power to the third output terminal of a predetermined phase and amplitude, relative to the other two output terminals, to result in balanced three phase AC power at the three output terminals. The phase converter provides balanced three phase output for leading power factor, lagging power factor, and resistive loads.

21 Claims, 5 Drawing Sheets

PHASE CONVERTER

This is a continuation-in-part of application Ser. No. 09/383,795 filed Aug. 26, 1999 now abandoned. This application claims the benefit under 35 U.S.C. § 119(e) of the U.S. provisional patent application no. 60/132,551 filed May 5, 1999.

TECHNICAL FIELD

The present invention relates to phase converters and more particularly to a phase converter for converting single phase AC power to three phase AC power.

BACKGROUND ART

Three phase AC motors are generally simpler, more reliable and more efficient than single phase AC motors. In addition to three phase AC motors, much high-power industrial equipment requires three phase AC power. Three phase AC power is generally supplied to industrial areas. However, only single phase AC power is available to most residential and rural areas.

The single phase AC power available in most residential and rural areas is provided by a step down transformer connected a high voltage line and, in the United States, is normally supplied as about 240 volts at 60 Hz between the first and second input lines. The transformer is generally center tapped with a neutral line to provide two phases of about 120 volts that are separated by 180 degrees.

Phase converters and inverters convert single phase AC power to three phase AC power to power three phase motors. Phase converters generate a second voltage that is out of phase with the input voltage. The first phase is the voltage between the first and second input line, the second phase is the voltage between the first input line and the second voltage and the third phase is the voltage between the second input line and the second voltage. Three equal phases spaced 120 degrees apart are provided if the second voltage has an amplitude of $\sqrt{3/2}$ times the amplitude of the input voltage and is 90 degrees out of phase with the input voltage.

The two types of phase converters generally available are the static phase converter and the rotary phase converter. In prior known static phase converters for use with inductive loads two terminals from the input supply were connected to two of the windings of a three phase motor and a capacitor was connected in series between the third winding and one of the terminals from the input supply. The capacitor in combination with the inductive load creates a lead circuit to provide the out of phase second voltage.

Such phase converters are disclosed in U.S. Pat. No. 4,492,911 to Molitor, U.S. Pat. No. 4,777,421 to West, U.S. Pat. No. 3,673,480 to Johnstone and U.S. Pat. No. 5,621,296 to Werner et al. This type of phase converter includes a large capacitor for starting the motor and a smaller capacitor for running the motor. This type of phase converter is relatively inexpensive, however this type of phase converter can only be used with inductive loads. The capacitor must be selected for the specific inductive load to provide the correct phase shift. Also, the amplitude of the voltage out of the capacitor is at most one half the input voltage so this type of phase converter cannot provide balanced currents to the windings at varying loads. Unbalanced currents cause localized heating so that three phase motors run with this type of static phase converter can only be run at a fraction of the rated capacity.

U.S. Pat. No. 5,293,108 to Spudich discloses a static phase converter that includes a balancing coil between the two input lines and a capacitor connected between one input line and the third winding to shift the phase. As in the previously described static phase converters, two terminals from the input supply were connected to the first and second windings of a three phase motor, and a start capacitor and a smaller run capacitor are provided. The balancing coil and capacitor must be selected to match the impedance of the three phase load with this converter.

Rotary phase converters use motor-generators powered by single phase AC power to generate the second voltage signal. Rotary phase converters are disclosed in U.S. Pat. No. 4,656,575 to West, U.S. Pat. No. 5,065,305 to Rich, and U.S. Pat. No. 5,187,654 to Felippe. Rotary phase converters are generally more complex, more expensive and less efficient than static phase converters, and produce an unbalanced output which causes severe imbalances in the phase currents of three phase motors.

Inverters convert the entire single phase AC input voltage to a DC voltage with rectifiers and convert the DC voltage into three balanced AC phases with an inverter circuit. Examples of inverters are disclosed in U.S. Pat. No. 4,855,652 to Yamashita et al., U.S. Pat. No. 5,793,623 to Kawashima et al., U.S. Pat. No. 4,849,950 to Sugiura et al. and U.S. Pat. No. 4,978,894 to Takahara. The inverter circuit requires a minimum of six transistors and six diodes as well as control electronics for all of the transistor. Inverters are generally more complex and more expensive than static phase converters. Since the entire single phase AC input voltage is converted to DC, inverters are inherently less efficient than static phase converters. The output voltage of inverters consists of a pulse-width-modulated (PWM) signal with a high harmonic content, limiting their application to inductive loads. The high frequency harmonics present in the output voltages cause unwanted reflections in the wires connecting the inverter to the motor load, and limit the acceptable distance between the inverter and the motor.

Disclosure of the Invention

A phase converter of the static type for converting single phase AC power to balanced three phase power AC is disclosed. The phase converter disclosed includes a charging circuit, first and second storage capacitors and an output circuit. The charging circuit is connected to an AC power source and includes means for rectifying the positive component of the input voltage and means for stepping up the positive component of the input voltage to charge the first storage capacitor with a positive voltage of about +350V. Means are provided for rectifying the negative component of the input voltage and for stepping up the negative component of the input voltage to charge the second storage capacitor with a negative voltage of about −350V. The charging circuit includes first and second switches that are switched by control electronics at a relatively high frequency with a selected variable duty cycle to provide a sinusoidal input current from the AC power source. The first and second storage capacitors have a common connection that is connected to the AC power source provide a reference voltage level for the capacitor charging. The output circuit includes first, second and third output terminals and means, connected to the first and second storage capacitor and to the third output terminal, for providing a selected AC output power signal to the third output terminal from the positive voltage in the first storage capacitor and from the negative voltage in the second storage capacitor. The first output terminal connects to the first input terminal from the AC power source and the second output terminal connects to the second input terminal from the AC power source.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
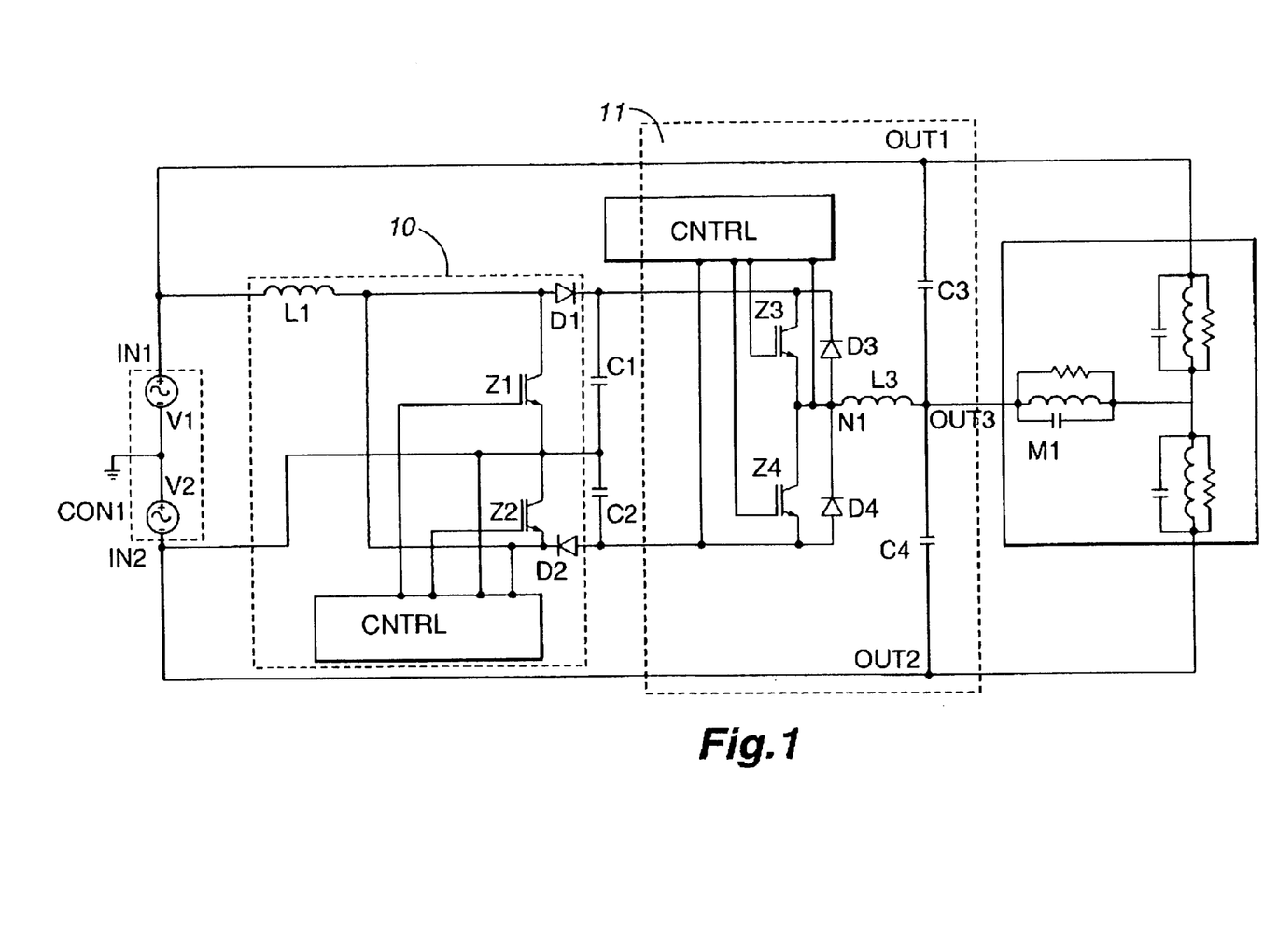
FIG. 1 is a schematic circuit diagram of a phase converter embodying the features of the present invention.

Referring now to FIG. 1, the phase converter embodying features of the present invention includes an input connector CON1, a charging circuit 10, first and second storage capacitors C1 and C2, and an output circuit 11. The input connector CON1 is typically a standard 240V plug. The output circuit 11 is connected to a three phase load, shown as a three phase motor M1. The input connector CON1 has a first input terminal IN1 for connecting to a first line from a single phase AC power source and a second input terminal IN2 for connecting to a second input line from a single phase AC power source.

The charging circuit 10 has a first inductor L1, first and second switches, shown as insulated gate bipolar (IGBT) first and second transistors Z1 and Z2, first and second diodes D1 and D2, and control electronics CNTRL. One end of the first inductor L1 is connected to the first input terminal IN1. The anode of the first diode D1, the cathode of the second diode D2, the collector of the first transistor Z1 and the emitter of the second transistor Z2 all are connected to the other end of the first inductor L1. The emitter of the first transistor Z1 and the collector of the second transistor Z2 are connected to the second input terminal IN2. The control electronics CNTRL is connected to the gates of the first and second transistors Z1 and Z2 and functions to selectively switch the first and second transistors Z1 and Z2 on and off.

The first and second storage capacitors C1 and C2 are serially connected. The end of each of the first and second storage capacitors C1 and C2 that is positively charged by the charging circuit will hereinafter be designated the positive end and the opposite end will be designated the negative end. Preferably, the first and second storage capacitors C1 and C2 are electrolytic capacitors having positive and negative ends. The positive end of the first storage capacitor C1 is connected to the cathode of the first diode D1 and the negative end of the second storage capacitor C2 is connected to the anode of the second diode D2. The negative end of the first storage capacitor C1 and the positive end of the second storage capacitor C2 have a common connection that is connected to the second input terminal IN2, thereby referencing the common connection to the voltage level at the second input terminal IN2.

In a circuit without the first inductor L1 and the first and second transistors Z1 and Z2, the first diode D1 would feed directly from the first input terminal IN1 to the first storage capacitor C1. Current would only flow from the first input terminal IN1 through the first diode D1 to the first storage capacitor C1 to charge the first storage capacitor C1 when the voltage between the first input terminal IN1 and the second input terminal IN2 was greater than the voltage on the first storage capacitor C1. For an AC source supplying 240 Vrms, the voltage between the first input terminal IN1 and the second input terminal IN2 is V=sin $\phi \times 340$. As the voltage on the first storage capacitor C1 approaches the maximum amplitude of the voltage of the AC source, current would flow to the first storage capacitor C1 only during the short period of time each cycle when the amplitude of the voltage of the AC source exceeds the voltage on the first storage capacitor C1. For example, when the first storage capacitor C1 was charged to 330 V, current would flow to the first storage capacitor C1 when $76° < \phi < 104°$, or 16% of the positive portion of each cycle. Since there would be almost no impedance between the first input terminal IN1 and the first storage capacitor C1, there would be a large current flow during this short period of time each cycle. Similarly, current would only flow through the second diode D2 to charge the second storage capacitor C2 for the short period of time each cycle when the voltage at the first input terminal IN1 was less or more negative than the voltage at the negative end of the second storage capacitor C2. The current flow into the charging circuit 10 would be highly peaked at the point of maximum voltage and the capacitor charging would occur only during a small portion of each cycle. Such an input current flow can create problems for power utilities and can distort the input voltages which are applied across two of the output terminals, as will be described hereinafter.

In the circuit of the present invention, during the portion of each AC cycle in which the voltage at the first input terminal IN1 is positive, the second transistor Z2 is off or open, and the first transistor Z1 is switched on and off at a high frequency with a variable duty cycle. When the first transistor Z1 is on or closed, the first inductor L1 is shorted to the second input terminal IN2, inducing current flow through first inductor L1. When the first transistor Z1 is off, the current continues to flow due to the inductive action of the first inductor L1. This current flows through the first diode D1 to the positive end of the first storage capacitor C1. Since the current flows to the first storage capacitor C1 even when the voltage at the first input terminal IN1 is less than the voltage at the positive end of the first storage capacitor C1, the combination of the first inductor L1 and the first transistor Z1 can step up the voltage at the positive end of the first storage capacitor C1 to a voltage greater than the maximum voltage at the first input terminal IN1. Similarly, when the voltage at the first input terminal IN1 is negative, the first transistor Z1 is off and the second transistor Z2 is switched on and off to induce a current flow into the charging circuit to provide sinusoidal input current and to step up the negative voltage at the negative end of the second storage capacitor C2.

The pattern of the variable duty cycle of first and second transistors Z1 and Z2 is selected to provide a sinusoidal input current in phase with the input AC voltage. Preferably, in accordance with the present invention, the first transistor Z1 is switched with a pulse width modulation (PWM) that obeys the equation $D_1 = 1 - |V_1|/V_{C_1}$, where $V_1$ is the instantaneous voltage at the first input terminal IN1, $V_{C_1}$ is the voltage at the positive end of the first storage capacitor C1 and $D_1$, the duty cycle, is the portion of each PWM cycle the first transistor Z1 is on. The PWM frequency f, as an example and not a limitation, can be in the range of about 10 kHz to 100 kHz. Therefore, for the first transistor Z1, the on-time $t_1 = D_1/f$. Similarly, for the second transistor Z2 the duty cycle is $D_2 = 1 - |V_1|/V_{C_2}$ and the on-time is $t_2 = D_2/f$. The sinusoidal input current of the circuit of the present invention prevents distortion of the input voltages and possible problems for power utilities.

The output circuit 11 includes first, second and third output terminals OUT1, OUT2 and OUT3, third and fourth diodes D3 and D4, third and fourth switches, shown as third and fourth transistors Z3 and Z4, a third inductor L3, third and fourth capacitors C3 and C4, an output node N1 and control electronics CNTRL. The cathode of the third diode D3 and the collector of the third transistor Z3 are connected to the positive end of the first storage capacitor C1, and the anode of the fourth diode D4 and the emitter of the fourth transistor Z4 are connected to the negative end of the second storage capacitor C2. The anode of the third diode D3, the cathode of the fourth diode D4, the emitter of the third transistor Z3 and the collector of the fourth transistor Z4 all are connected to output node N1.

The gates of the third and fourth transistors Z3 and Z4 are connected to the control electronics CNTRL. The control electronics CNTRL switches the third transistor Z3 and the fourth transistor Z4, on and off at a high frequency with a PWM pattern that produces an average voltage sinusoidal waveform. When Z3 is on, Z4 is off and vice versa.

The first output terminal OUT1 is connected directly to the first input terminal IN1, the second output terminal OUT2 is connected directly to the second input terminal IN2. A third inductor L3 is connected between the output node N1 and the third output terminal OUT3. The third capacitor C3 is connected from the first output terminal OUT1 to the third output terminal OUT3 and the fourth capacitor C4 is connected from the second output terminal OUT2 to the third output terminal OUT3. The first, second and third output terminals OUT1, OUT2 and OUT3 are shown connected to a three-phase AC electric motor M1. The circuit shown in FIG. 1 is suitable for use with inductive, resistive, capacitive and leading power loads. In a phase converter used only with inductive and resistive loads, node N1 could be connected directly to the third output terminal OUT3, and the second inductor L3 and the third and fourth capacitors C3 and C4 would not be required.

Figure 2:
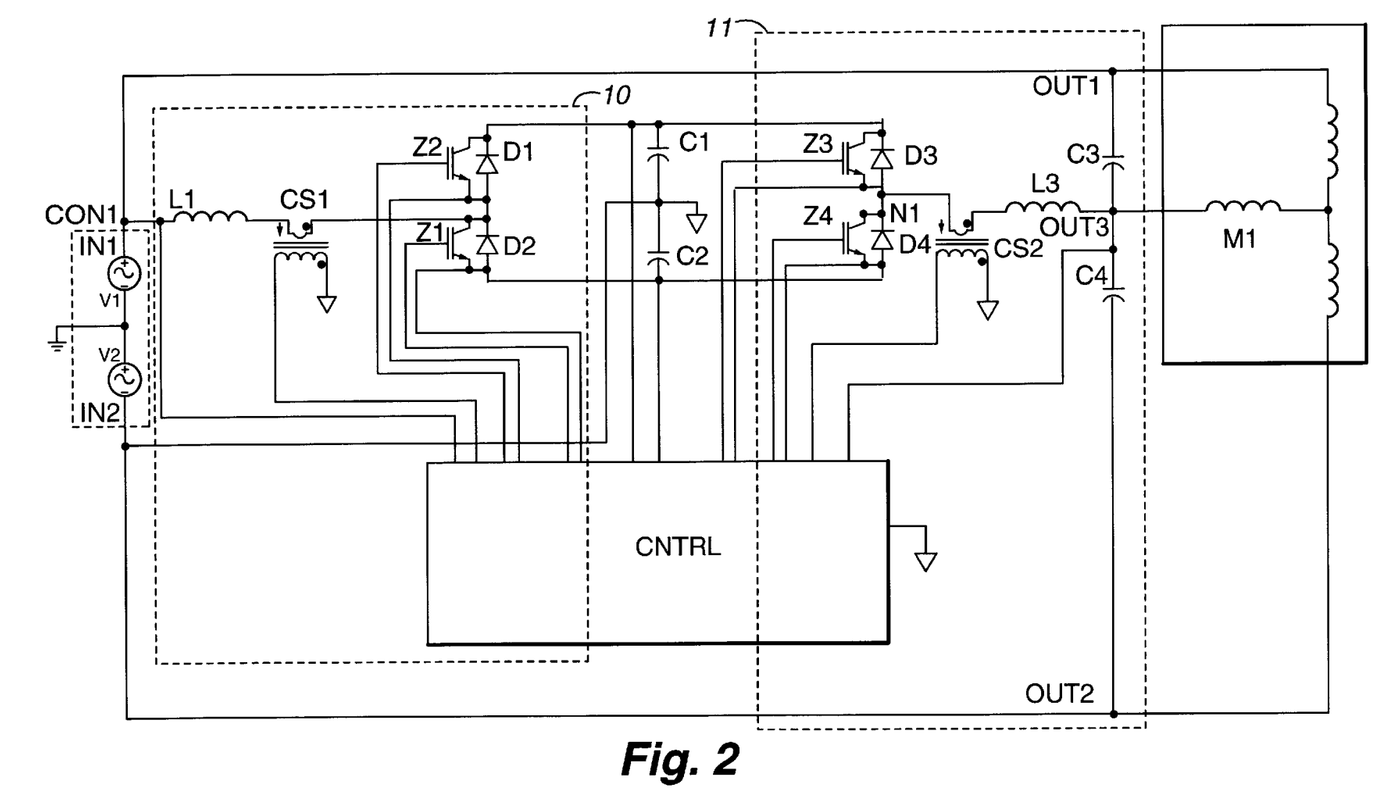
FIG. 2 is a schematic circuit diagram of an another phase converter embodying the features of the present invention.

FIG. 2 shows a circuit diagram of a phase converter embodying features of the present invention, similar to the circuit diagram of FIG. 1, with a modified charging circuit. The emitter of the first transistor Z1 is connected to the negative end of the second storage capacitor C2 instead of to the second input terminal IN2. The collector of the second transistor Z2 is connected to the positive end of the first storage capacitor C1 instead of to the second input terminal IN2. With this circuit, when the voltage across the first and second capacitors C1 and C2 becomes too large, power can be directed back to the first input terminal IN1.

The sequence of operation of the first and second transistors Z1 and Z2 for normal charging of the first and second storage capacitors C1 and C2 is the same as described above for FIG. 1, except that during the portion of the cycle when the input voltage is positive, when Z1 is on, the voltage available to force current through L1 is $V_1+|V_{C2}|$ instead of just $V_1$. A similar sequence occurs during the negative portion of the cycle when Z2 is on. When the voltage across the first and second capacitors C1 and C2 becomes too large, during the portion of each AC cycle in which the voltage at the first input terminal IN1 is positive, the first transistor Z1 is off or open, and the second transistor Z2 is switched on and off at a high frequency with a variable duty cycle to provide sinusoidal current flow with power flowing from the first storage capacitor C1 to the first input terminal IN1. Similarly, during the portion of each AC cycle in which the voltage at the first input terminal IN1 is negative, the second transistor Z2 is off or open, and the first transistor Z1 Z2 is switched on and off at a high frequency with a variable duty cycle so that power flows from the second storage capacitor C2 to the first input terminal IN1.

A first current sensing device, shown as first current sensing transformer CS1, is connected between the first inductor L1 and the common connection of the cathode of the first diode D1, the anode of the second diode D2, the collector of the first transistor Z1 and the emitter of the second transistor Z2. A second current sensing device, shown as second current sensing transformer CS2, is connected between the output node N1 and the third inductor L3. The first and second current sensing transformers CS1 and CS2 connect to the control electronics CNTRL. The control electronics CNTRL monitors the current through the first current sensing transformer CS1, the voltage $V_1$ at IN1, and the voltages across capacitors C1 and C2 to calculate the PWM duty cycles for the first and second transistors Z1 and Z2 to provide sinusoidal input current. The control electronics CNTRL monitors the current through the second current sensing transformer CS2, the voltage at OUT3, and the voltages across capacitors C1 and C2 to calculate the PWM duty cycles for the third and fourth transistors Z3 and Z4 to provide the proper phase sinusoidal output signal.

Figure 3:
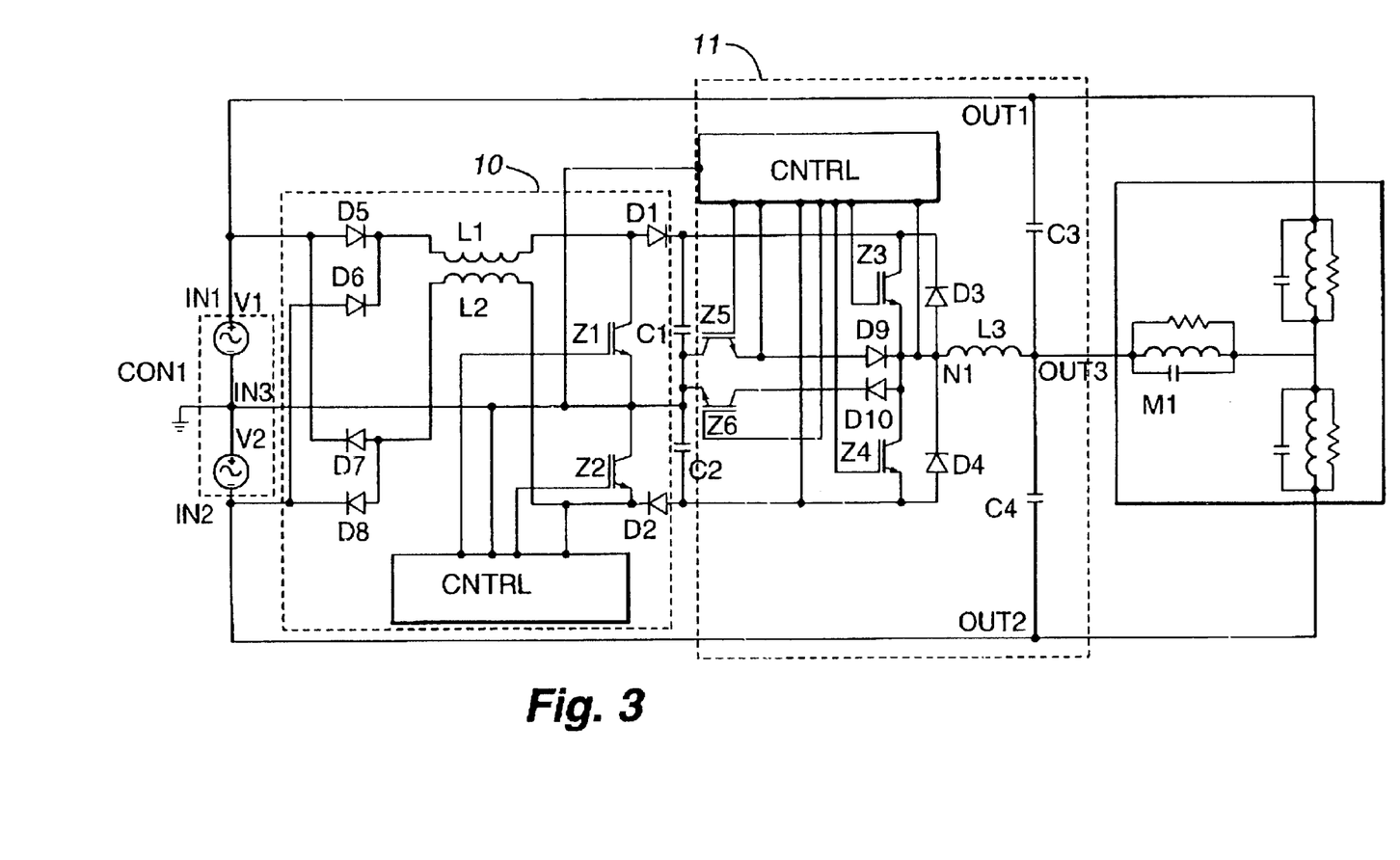
FIG. 3 is a schematic circuit diagram of an another phase converter embodying the features of the present invention.

FIG. 3 shows a phase converter, similar to the phase converter of FIG. 1, with a modified charging circuit 10 and a modified output circuit 11. The input connector CON1 has a first input terminal IN1 for connecting to a first line from a single phase AC power source, a second input terminal IN2 for connecting to a second line from a single phase AC power source and a third input terminal IN3 for connection to a neutral line.

The charging circuit 10 has first and second inductors L1 and L2, first and second switches, shown as IGBT first and second transistors Z1 and Z2, first and second, fifth, sixth, seventh and eighth diodes D1, D2, D5, D6, D7 and D8, and control electronics CNTRL. The anode of the fifth diode D5 is connected to the first input terminal IN1 and the anode of the sixth diode D6 is connected to the second input terminal IN2. One end of the first inductor L1 connects to the cathodes of the fifth and sixth diodes D5 and D6. The anode of the first diode D1 and the collector of the first transistor Z1 are connected to the other end of the first inductor L1.

The cathode of the seventh diode D7 is connected to the first input terminal IN1 and the cathode of the eighth diode D8 is connected to the second input terminal IN2. One end of the second inductor L2 connects to the anodes of the seventh and eighth diodes D7 and D8. The cathode of the second diode D2 and the emitter of the second transistor Z2 are connected to the other end of the second inductor L2.

The emitter of the first transistor Z1 and the collector of the second transistor Z2 are connected to the third input terminal IN3. The control electronics CNTRL is connected to the gates of the first and second transistors Z1 and Z2 to switch the first and second transistors Z1 and Z2 on and off. The first and second inductors L1 and L2 can be on a single core, as shown, or on separate cores.

The positive end of the first storage capacitor C1 is connected to the cathode of the first diode D1 and the negative end of the second storage capacitor C2 is connected to the anode of the second diode D2. The negative end of the first storage capacitor C1 and the positive end of the second storage capacitor C2 have a common connection that is connected to the third input terminal IN3, thereby referencing the common connection of the first and second storage capacitor C1 and C2 to the voltage level of the neutral input line.

This charging circuit 10 provides full wave rectification of the input power whereas the circuit shown in FIGS. 1 and 2 provide half wave rectification, so that more power is provided for each AC cycle. Full wave charging reduces the ripple voltage across the first and second storage capacitors C1 and C2. This circuit requires more voltage boost from the step up arrangement of the inductors and transistors and more components than the half wave circuits. This circuit also requires a connecting to a neutral input line. The full wave circuit is more suitable for higher power applications and the half wave circuits are more suitable for lower power, lower cost applications.

The output circuit 11 includes first, second and third output terminals OUT1, OUT2 and OUT3, third, fourth, ninth and tenth diodes D3, D4, D9 and D10, third, fourth, fifth and sixth switches, shown as third, fourth, fifth and sixth transistors Z3, Z4, Z5 and Z6, a third inductor L3, third and fourth capacitors C3 and C4, an output node N1 and control electronics CNTRL. The cathode of the third diode D3 and the collector of the third transistor Z3 are connected to the positive end of the first storage capacitor C1, and the anode of the fourth diode D4 and the emitter of the fourth transistor Z4 are connected to the negative end of the second storage capacitor C2. The anode of the third diode D3, the cathode of the fourth diode D4, the emitter of the third transistor Z3 and the collector of the fourth transistor Z4 all are connected to output node N1.

The cathode of the ninth diode D9 and the anode of the tenth diode D10 are connected to the output node N1. The emitter of the fifth transistor Z5 is connected to the anode of the ninth diode D9 and the collector of the fifth transistor Z5 is connected to the third input terminal IN3. The collector of the sixth transistor Z6 is connected to the cathode of the tenth diode D10 and the emitter of the sixth transistor Z6 is connected to the third input terminal IN3.

The gates of the third, fourth, fifth and sixth transistors Z3, Z4, Z5 and Z6 are connected to the control electronics CNTRL. The control electronics CNTRL switches the fifth transistor Z5 on and the third transistor Z3 on and off at a high frequency during the positive portion of each output cycle with a PWM pattern that produces an average voltage sinusoidal positive half wave, and switches the sixth transistor Z6 on and the fourth transistor Z4 on and off at a high frequency during the negative portion of each output cycle with a PWM pattern that produces an average voltage sinusoidal negative half wave. The fifth and sixth transistors Z5 and Z6, with the ninth and tenth diodes D9 and D10 reduce the high frequency harmonics in the output waveform.

Figure 4:
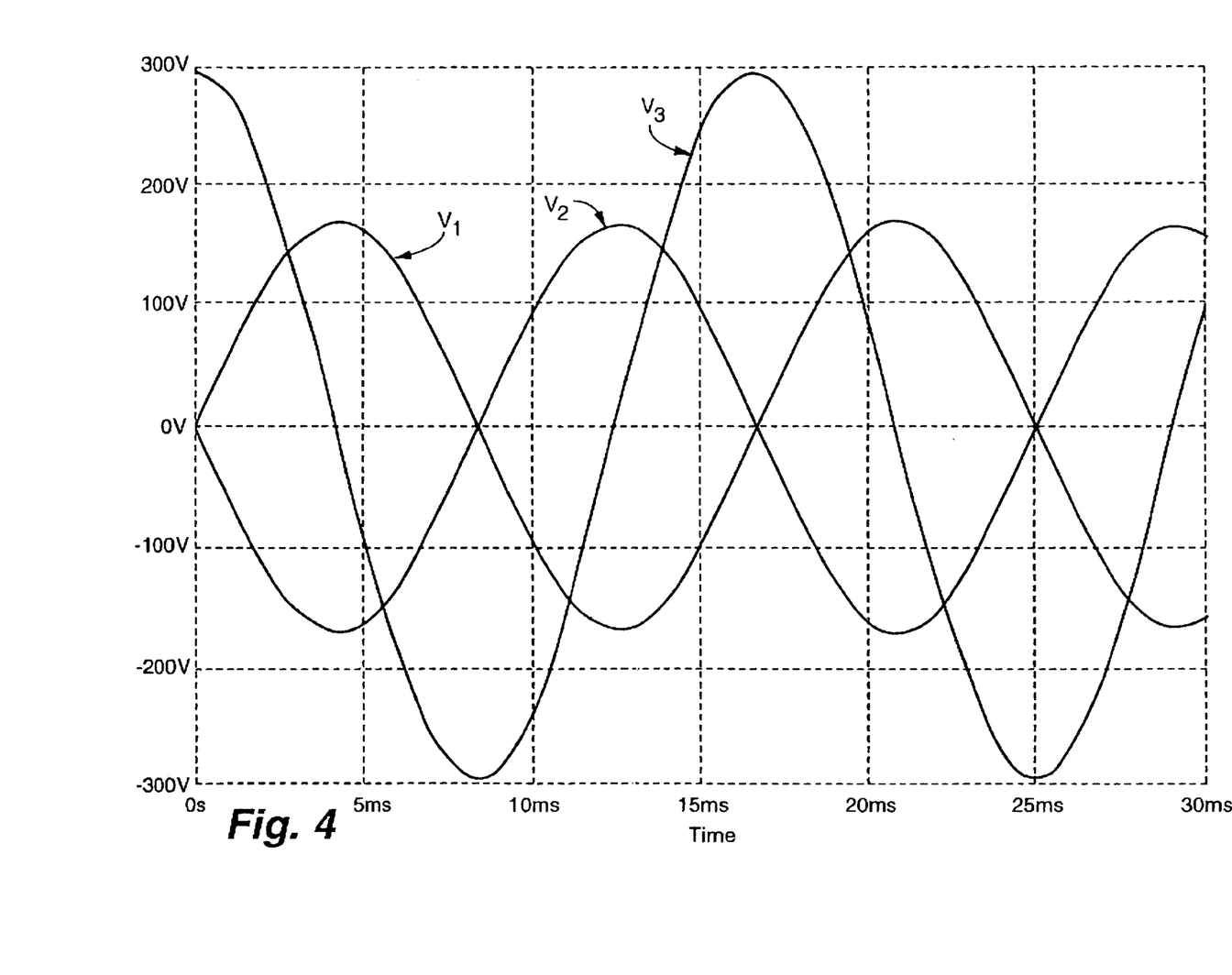
FIG. 4 is a graphical representation of the output voltages of the phase converter of the present invention.
Figure 5:
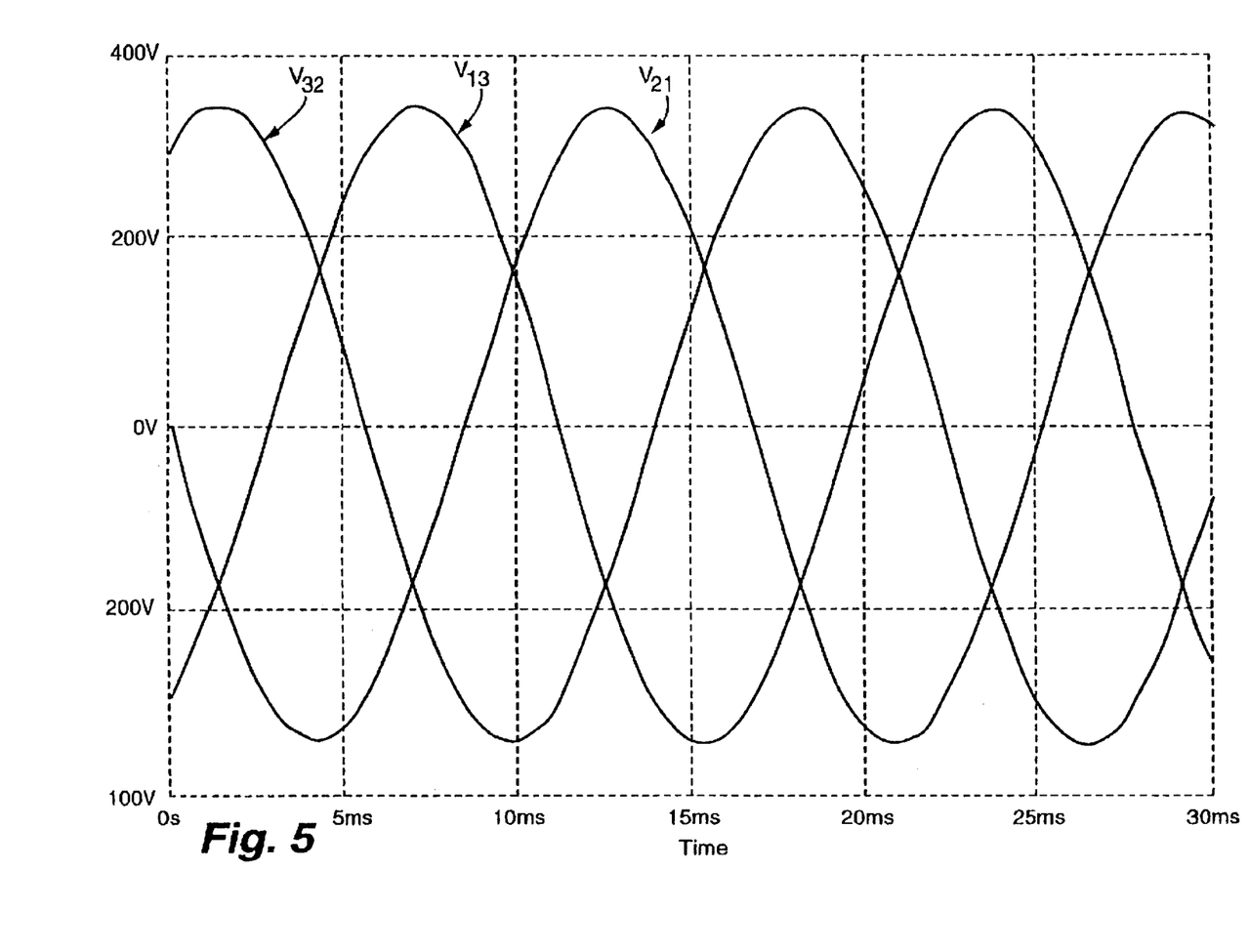
FIG. 5 is a graphical representation of the relative output voltages of the phase converter of the present invention.

FIG. 4 shows the voltages $V_1$, $V_2$ and $V_3$ at the first, second and third output terminals OUT1, OUT2 and OUT3, respectively, over a period of about 30 milliseconds. The voltages $V_1$ and $V_2$ are about 120 Vrms with a maximum amplitude of $120 \times \sqrt{2} = 170V$ and are 180 degrees out of phase. The maximum amplitude of voltage $V_3$ is $170 \times \sqrt{3} = 294V$ and voltage $V_3$ is 90 degrees out phase with $V_1$ and $V_2$. FIG. 5 shows these same voltages as the voltages $V_{32}$, $V_{13}$ and $V_{21}$ between the first, second and third output terminals OUT1, OUT2 and OUT3. In this way, by increasing the amplitude of the voltage at the third output terminal OUT3 and shifting the phase by 90 degrees, balanced three phase AC power is produced by the converter and supplied to the load. The static phase converter of the present invention, unlike many prior known devices, does not require that the components be selected to match a specific load and provides balanced three phase AC power over a range of loads. This static phase converter is more efficient, less complex and less expensive than prior known inverters. This phase converter provides sinusoidal input current instead of highly peaked input current, preventing negative effects on the power grid. This phase converter can be used to supply power to inductive, capacitive or resistive loads.

Although the present invention has been described with a certain degree of particularity, it is understood that the present disclosure has been made by way of example and that changes in details of structure may be made without departing from the spirit thereof.

What is claimed is:

1. A phase converter for converting single phase AC power to balanced three phase AC power comprising:

an input connector connectable to a single phase AC power source and including first and second input terminals, first, second and third output terminals for connection to a three phase load, said first output terminal being connected to said first input terminal and said second output terminal being connected to said second input terminal, first and second capacitors each having a positive end and a negative end, said negative end of said first capacitor and said positive end of said second storage capacitor being connected together and to said input connector to provide a reference voltage level, first circuit means, connected to said first input terminal, to said positive end of said first capacitor and to said negative end of said second capacitor, for controllably charging said first capacitor with a positive voltage and said second capacitor with a negative voltage, second circuit means, connected to said third output terminal, to said positive end of said first capacitor and to said negative end of said second capacitor, for controllably discharging said first and second capacitors for supplying single phase AC power of a predetermined amplitude and phase, relative to the amplitude and phase of the power at said first and second output terminals, to said third output terminal, to result in balanced three phase AC power to said first, second and third output terminals.

2. The converter as set forth in claim 1 wherein said negative end of said first capacitor and said positive end of said second capacitor are connected to said second input terminal to provide said reference voltage level.

3. The converter as set forth in claim 2 wherein said first circuit means includes a first inductor, first and second switches and first and second diodes each having an anode and a cathode, said first inductor having first and second ends with said first end being connected to said first input terminal, said first and second switches each having an input, an output and a control terminal, said anode of said first diode, said cathode of said second diode, said input of said first switch and said output of said second switch being connected to said second end of said first inductor, said cathode of said first diode being connected to said positive end of said first storage capacitor and said anode of said second diode being connected to said negative end of said second storage capacitor.

4. The converter as set forth in claim 3 wherein said first circuit means includes third means, connected to said control terminals of said first and second switches, for controlling said first and second switches to switch said switches on and off, and thereby induce current flow with said first inductor to step up input voltage to said first and second capacitors and provide a sinusoidal input current.

5. The converter as set forth in claim 3 wherein said output of said first switch and said input of said second switch are connected to said second input terminal.

6. The converter as set forth in claim 3 wherein said output of said first switch is connected to said negative end of said second storage capacitor and said input of said second switch is connected to said positive end of said first storage capacitor.

7. The converter as set forth in claim 1 wherein said input connector includes a third input terminal connectable to a neutral line from said single phase AC power source, and said negative end of said first capacitor and said positive end of said second capacitor are connected to said third input terminal to provide said reference voltage level.

8. The converter as set forth in claim 7 wherein said first circuit means includes first and second inductors, first and second switches, and first, second, fifth, sixth, seventh and eighth diodes each having an anode and a cathode, said anode of said fifth diode and said cathode of said seventh diode being connected to said first input terminal, said anode of said sixth diode and said cathode of said eighth diode being connected to said second input terminal, said first inductor having first and second ends with said first end being connected to said cathodes of said fifth and sixth diodes, said second inductor having first and second ends with said first end being connected to said anodes of said seventh and eighth diodes, and said first and second switches each having an input, an output and a control terminal, said anode of said first diode and said input of said first switch being connected to said second end of said first inductor and said cathode of said second diode and said output of said second switch being connected to said second end of said second inductor, said cathode of said first diode being connected to said positive end of said first capacitor and said anode of said second diode being connected to said negative end of said second capacitor, and said output of said first switch and said input of said second switch being connected to said third input terminal.

9. The converter as set forth in claim 1 wherein said second circuit means includes third and fourth diodes, third and fourth switches, and an output node, said third and fourth diodes each having an anode and a cathode, said third and fourth switches each having an input, an output and a control terminal, said cathode of said third diode and the input of said third switch being connected to said positive end of first capacitor, said anode of said fourth diode and said output of said fourth switch being connected to said negative end of said second capacitor, said anode of said third diode, said cathode of said fourth diode, said output of said third switch and said input of said fourth switch being connected to said output node, and said output node being connected to said third output terminal.

10. The converter as set forth in claim 9 within said second circuit means includes fifth and sixth switches, each having an input, an output and a control terminal, and ninth and tenth diodes, each having an anode and a cathode, said cathode of said ninth diode and said anode of said tenth diode being connected to said output node, said output of said fifth switch being connected to said anode of said ninth diode, said input of said sixth switch being connected to said cathode of said tenth diode, and said input of said fifth switch and said output of said sixth switch each being connected to said negative end of said first capacitor and said positive end of said second capacitor.

11. The converter as set forth in claim 10 wherein said second circuit means includes fourth means, connected to said control terminals of said third, fourth, fifth and sixth switches, for controlling said third, fourth, fifth and sixth switches to switch said switches on and off with said fifth and sixth switches being alternately turned on for one half the period of said single phase signal, said third switch being switched on and off at a high frequency in a pulse width modulated sequence to produce an average voltage positive one half sine wave while said fifth switch is on and said fourth switch being switched on and off at a high frequency in a pulse width modulated sequence to produce an average voltage negative one half sine wave while said sixth switch is on.

12. The converter as set forth in claim 9 wherein said second circuit means includes third and fourth capacitors and a third inductor, said third inductor connecting said output node to said third output terminal, said third capacitor being connected between said first output terminal and said third output terminal, and said fourth capacitor being connected between said second output terminal and said third output terminal.

13. A phase converter for converting single phase AC power to balanced three phase AC power comprising:

first and second input terminals connectable to a pair of input lines, first, second and third output terminals connectable to a three phase load, with said first output terminal connecting to said first input terminal and with said second output terminal connecting to said second input terminal, a charging circuit including a first inductor, first and second switches and first and second diodes, said first inductor having first and second ends with said first end being connected to said first input terminal, said first and second diodes each having an anode and a cathode, said first and second switches each having an input, an output and a control terminal, said anode of said first diode, said cathode of said second diode, said input of said first switch and said output of said second switch being connected to said second end of said first inductor, first and second capacitors each having a positive end and a negative end, said positive end of said first capacitor being connected to said cathode of said first diode, said negative end of said second capacitor being connected to said anode of said second diode, and said negative end of first capacitor being connected to said positive end of said second capacitor, an output circuit having a positive input, a negative input and an output, said positive input being connected to said positive end of said first capacitor, said negative input being connected to said negative end of said second capacitor, said output of said output circuit being connected to said third output terminal, and a control module having a first control output connected to said control terminal of said first switch and a second control output connected to said control terminal of said second switch, whereby said control module switches said first switch on and off at a high frequency when the voltage at said first input terminal is positive to induce current flow through said first inductor to charge said first capacitor with a positive voltage and said control module switches said second switch on and off at a high frequency when the voltage at said first input terminal is negative to induce current flow through said first inductor to charge said second capacitor with a negative voltage.

14. The converter as set forth in claim 13 wherein said negative end of said first capacitor and said positive end of said second capacitor are connected to said second input terminal.

15. The converter as set forth in claim 14 wherein said output of first switch and said input of said second switch are connected to said second input terminal.

16. The converter as set forth in claim 14 wherein said output of said first switch is connected to said negative end of said second capacitor and said input of said second switch is connected to said positive end of said first capacitor.

17. A phase converter for converting single phase AC power to balanced three phase AC power comprising:

first and second input terminals connectable to a pair of input lines, first, second and third output terminals connectable to a three phase load, with said first output terminal connecting directly to said first input terminal and with said second output terminal connecting directly to said second input terminal, and a converter circuit including a charging portion, first and second capacitors each having a positive and a negative end, an output circuit connected to said third output terminal, and control electronics, said charging portion including first and second diodes each having an anode and a cathode, a first inductor having first and second ends, and first and second transistors each having an emitter, a collector and a gate, said first end of said first inductor being connected to said first input terminal, said anode of said first diode, said cathode of said second diode, said collector of said first transistor and said emitter of said second transistor being connected to said second end of said first inductor, and said emitter of said first transistor and said collector of said second transistor being connected to said second input terminal, said positive end of said first capacitor being connected to said cathode of said first diode, said negative end of said second capacitor being connected to said anode of said second diode, said negative end of said first capacitor and said positive end of said second capacitor being connected to said second input terminal, said output circuit including third and fourth diodes each having an anode and a cathode, third and fourth transistors each having an emitter, a collector and a gate, and an output node, said cathode of said third diode and said collector of said third transistor being connected to said positive end of first capacitor, said anode of said fourth diode and said emitter of said fourth transistor being connected to the negative end of said second capacitor, said anode of said third diode, said cathode of said fourth diode, said emitter of said third transistor and said collector of the fourth transistor being connected to said output node, and said output node being connected to said third output terminal, said control electronics including first, second, third and fourth outputs, said first output being connected to said gate of said first transistor, said second output being connected to said gate of said second transistor, said third output being connected to said gate of said third transistor, and said fourth output being connected to said gate of said fourth transistor.

18. The converter as set forth in claim 17 including a third inductor and third and fourth capacitors, said output node being connected to said third output terminal through said third inductor, said third capacitor being connected between said first output terminal and said third output terminal, and said fourth capacitor being connected between said second output terminal and said third output terminal.

19. A phase converter for converting single phase AC power to balanced three phase AC power comprising:

first and second input terminals connectable to a pair of input lines, first, second and third output terminals connectable to a three phase load, with said first output terminal connecting directly to said first input terminal and with said second output terminal connecting directly to said second input terminal, and a converter circuit including a charging portion, first and second Capacitors each having a positive and a negative end, an output circuit connected to said third output terminal, and control electronics, said charging portion including first and second diodes each having an anode and a cathode, a first inductor having first and second ends, and first and second transistors each having an emitter, a collector and a gate, said first end of said first inductor being connected to said first input terminal, said anode of said first diode, said cathode of said second diode, said collector of said first transistor and said emitter of said second transistor being connected to said second end of said first inductor, and said emitter of said first transistor being connected to said negative end of said second capacitor and said collector of said second transistor being connected said positive end of said first capacitor, said positive end of said first capacitor being connected to said cathode of said first diode, said negative end of said second capacitor being connected to said anode of said second diode, said negative end of said first capacitor and said positive end of said second capacitor being connected to said second input terminal, said output circuit including third and fourth diodes each having an anode and a cathode, third and fourth transistors each having an emitter, a collector and a gate, and an output node, said cathode of said third diode and said collector of said third transistor being connected to said positive end of first capacitor, said anode of said fourth diode and said emitter of said fourth transistor being connected to the negative end of said second capacitor, said anode of said third diode, said cathode of said fourth diode, said emitter of said third transistor and said collector of the fourth transistor being connected to said output node, and said output node being connected to said third output terminal, said control electronics including first, second, third and fourth outputs, said first output being connected to said gate of said first transistor, said second output being connected to said gate of said second transistor, said third output being connected to said gate of said third transistor, and said fourth output being connected to said gate of said fourth transistor.

20. The converter as set forth in claim 19 including a third inductor and third and fourth capacitors, said output node being connected to said third output terminal through said third inductor, said third capacitor being connected between said first output terminal and said third output terminal, and said fourth capacitor being connected between said second output terminal and said third output terminal.

21. A phase converter for converting a single phase AC power to balanced three phase AC power comprising:

first and second input terminals connectable to a pair of single phase AC power input lines, a third input terminal connectable to a neutral line, first, second and third output terminals connectable to a three phase load, with said first output terminal connecting directly to said first input terminal and with said second output terminal connecting directly to said second input terminal, and a converter circuit including a charging portion, first and second capacitors each having a positive and a negative end, an output circuit connected to said third output terminal, and control electronics, said charging portion including first, second, third, fourth, fifth and sixth diodes each having an anode and a cathode, first and second inductors each having a first and second end, and first and second transistors each having an emitter, a collector and a gate, said anode of said third diode being connected to said first input terminal, said anode of said fourth diode being connected to said second input terminal, said cathode of said fifth diode being connected to said first input terminal, and said cathode of said sixth diode being connected to said second input terminal, said first end of said first inductor being connected to said cathodes of said third and fourth diodes and said first end of said second inductor being connected to said anodes of said fifth and sixth diodes, said second end of said first inductor being connected to said anode of said first diode and said collector of said first transistor, and said second end of said second inductor being connected to said cathode of said second diode and said emitter of said second transistor, said gates of said first and second transistors being connected to said control electronics, and said emitter of said first transistor and said collector of said second transistor being connected to said third input terminal, said positive end of said first capacitor connecting to said cathode of said first diode, said negative end of said second capacitor connecting to said anode of said second diode, and said negative end of said first storage capacitor and said positive end of said second storage capacitor connecting to said third input terminal, said output circuit including seventh, eighth, ninth and tenth diodes each having an anode and a cathode, third, fourth, fifth, sixth transistors each having an emitter, a collector and a gate, a third inductor, third and fourth capacitors and an output node, said cathode of said seventh diode and said collector of said third transistor being connected to said positive end of said first capacitor, said anode of said eighth diode and said emitter of said fourth transistor being connected to said negative end of said second capacitor, said anode of said seventh diode, said cathode of said eighth diode, said emitter of said third transistor and said collector of said fourth transistor each being connected to said output node, said cathode of said ninth diode and said anode of said tenth diode being connected to said output node, said emitter of said fifth transistor being connected to said anode of said ninth diode, said collector of said sixth transistor being connected to said cathode of said tenth diode, and said collector of said fifth transistor and said emitter of said sixth transistor each being connected to said third input terminal, said gates of said third, fourth, fifth and sixth transistors being connected to said control electronics, and said third inductor connecting said output node to said third output terminal, said third capacitor being connected between said first output terminal and said third output terminal, and said fourth capacitor being connected between said second output terminal and said third output terminal.

\* \* \* \* \*